United States Patent [19]

Sugita

[11] Patent Number: 5,606,389
[45] Date of Patent: Feb. 25, 1997

[54] COMPACT CAMERA DESIGN TO MAKE MORE EFFECTIVE USE OF THE INTERIOR SPACE THEREOF

[75] Inventor: Yukihiko Sugita, Kokubunji, Japan

[73] Assignee: Olympus Optical Co., Ltd., Tokyo, Japan

[21] Appl. No.: 362,203

[22] Filed: Dec. 22, 1994

[30] Foreign Application Priority Data

Dec. 27, 1993 [JP] Japan .................................. 5-330142

[51] Int. Cl.$^6$ ........................... G03B 7/099; G03B 15/03; G03B 13/36; G03B 17/02
[52] U.S. Cl. ........................... 396/106; 396/176; 396/418; 396/373; 396/538; 396/539; 396/535
[58] Field of Search .................................. 354/403, 413, 354/476, 149.11, 173.1, 219, 288

[56] References Cited

U.S. PATENT DOCUMENTS 4,733,263  3/1988  Taniguchi et al. .............. 354/149.11 X
5,270,765 12/1993  Kunishige ................................ 354/403
5,426,478  6/1995  Katagiri et al. .................... 354/149.11

Primary Examiner—W. B. Perkey
Attorney, Agent, or Firm—Louis Weinstein

[57] ABSTRACT

A camera comprising a photographic optical system; an aperture formed behind the photographic optical system in order to limit a range of subject light irradiated to a film surface; a cartridge chamber lying on one side of the aperture so as to accommodate a small-sized film cartridge containing film that is smaller than rolled film of 35 mm width, in which a film cartridge is stowed so that a built-in take-up axis thereof is oriented substantially in parallel with the height of the camera; a take-up chamber lying on the other side of the aperture so as to wind in a portion of film that has been fed from the film cartridge stowed in the cartridge chamber in the lateral direction of the camera and has passed behind the aperture; a light projecting optical system lying above the take-up chamber to distribute light to be used for range finding toward an object to be photographed; and a light receiving optical system lying below the take-up chamber to receive light having emanated from the light projecting optical system and being reflected from the object to be photographed.

13 Claims, 2 Drawing Sheets

COMPACT CAMERA DESIGN TO MAKE MORE EFFECTIVE USE OF THE INTERIOR SPACE THEREOF

BACKGROUND Of THE INVENTION

1. Field of the Invention

The present invention relates to a camera, and more particularly, to a camera dedicated to a small-sized Patrone containing film that is smaller than rolled film of 35 mm wide.

2. Description of the Related Art

In the past, various proposals have been made for the layout of a camera and put to practical use. For example, when a light projecting lens and a light receiving lens which belong to a photometric optical system for automatic focusing are to be arranged in tandem, a photographing lens and a film take-up chamber or a Patrone chamber are spaced widely apart so that the lenses can be placed in the intermediate space. Alternatively, the light projecting and receiving lenses are placed in front of the film take-up chamber or Patrone chamber.

A Patrone designed to contain rolled film (35 mm wide) conformable to Japanese Industrial Standard JIS-135 and adaptable for many types of existing cameras has almost the same height as a battery to be incorporated in a camera.

In recent years, with a trend toward more compact cameras, there has been an increasing demand for a small-sized Patrone containing film that is smaller than the rolled film (of 35 mm wide) conformable to Japanese Industrial Standard JIS-135. More smaller cameras are in expectation.

However, as mentioned above, the incorporation of the light projecting and receiving lenses, which belong to a photometric optical system for automatic focusing, leads to an increase in width and thickness of a whole camera. When an attempt is made to juxtapose the light projecting and receiving lenses in the lateral direction of a camera, if the camera is designed compactly by employing a foregoing small-sized Patrone, a base length required for range finding to be performed as part of automatic focusing cannot be ensured.

OBJECTS AND SUMMARY Of THE INVENTION

The first object of the present invention is to provide a camera in which a base length required for automatic focusing is ensured despite the employment of a small-sized Patrone containing film that is smaller than rolled film 35 mm wide.

The second object of the present invention is to provide a camera in which spaces that are made available above and below a film take-up chamber due to the employment of the small-size Patrone are utilized effectively.

Briefly, a camera in accordance with the present invention has:

a photographic optical system;

an aperture formed behind the photographic optical system in order to limit a range of subject light irradiated to a film surface;

a cartridge chamber lying on one side of the aperture so as to accommodate a small-sized film cartridge containing film that is smaller than rolled film of 35 mm wide, in which a film cartridge is stowed so that a built-in take-up axis thereof is oriented substantially in parallel with the height of the camera;

a take-up chamber lying on the other side of the aperture so as to wind in a portion of film that has been fed from the film cartridge stowed in the cartridge chamber in the lateral direction of the camera and has passed behind the aperture;

a light projecting optical system lying above the take-up chamber so as to irradiate light to be used for range finding toward an object to be photographed; and a light receiving optical system lying below the take-up chamber so as to receive light emanated from the light projecting optical system and being reflected from the object to be photographed.

The above as well as others objects and advantages of the present invention will be further apparent from the detailed description set fourth below.

DETAILED DESCRIPTION Of THE PREFERRED EMBODIMENTS

Figure 1:
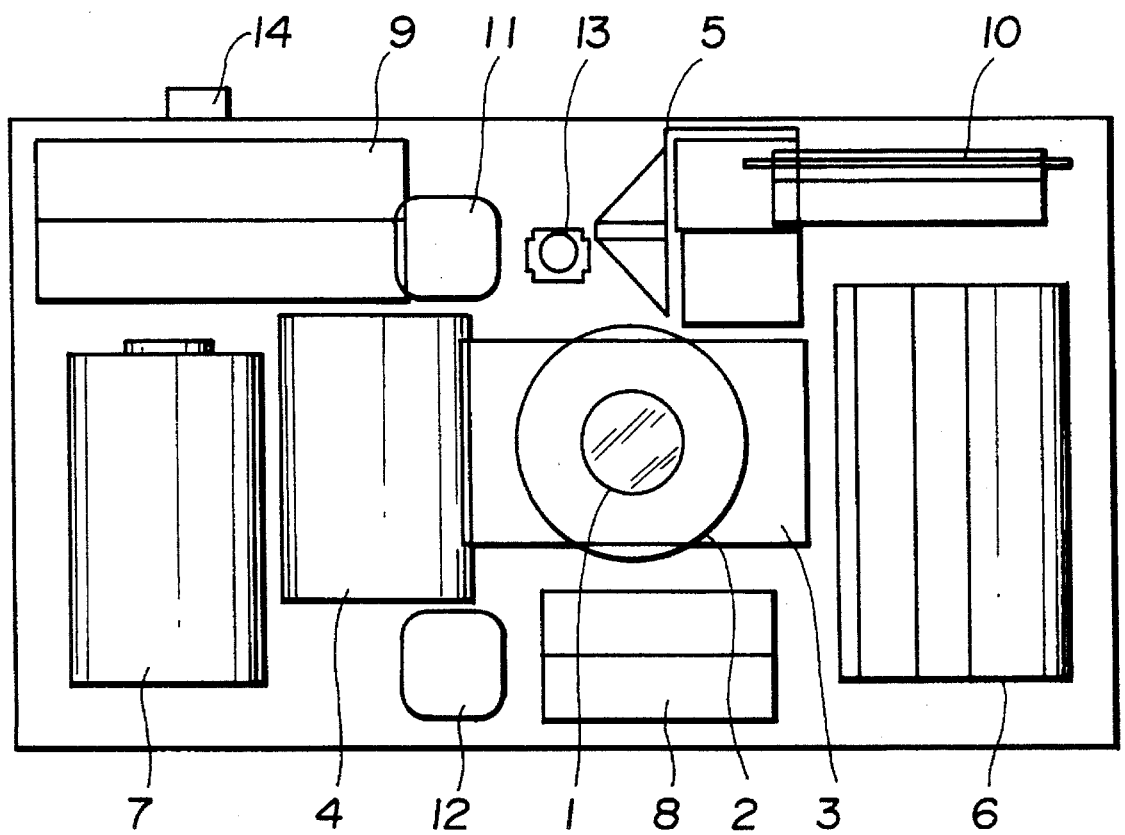
FIG. 1 is a front view showing the layout of major components of a camera in accordance with an embodiment of the present invention.

Referring to the drawings, an embodiment of the present invention will be described below.

Figure 2:
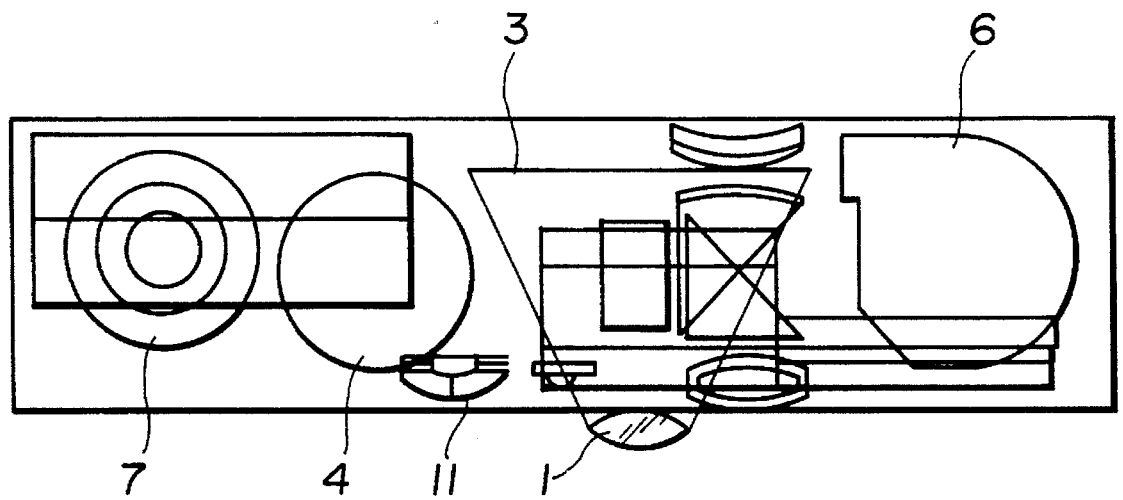
FIG. 2 is a top view showing the layout of major components of the camera of the embodiment.
Figure 3:
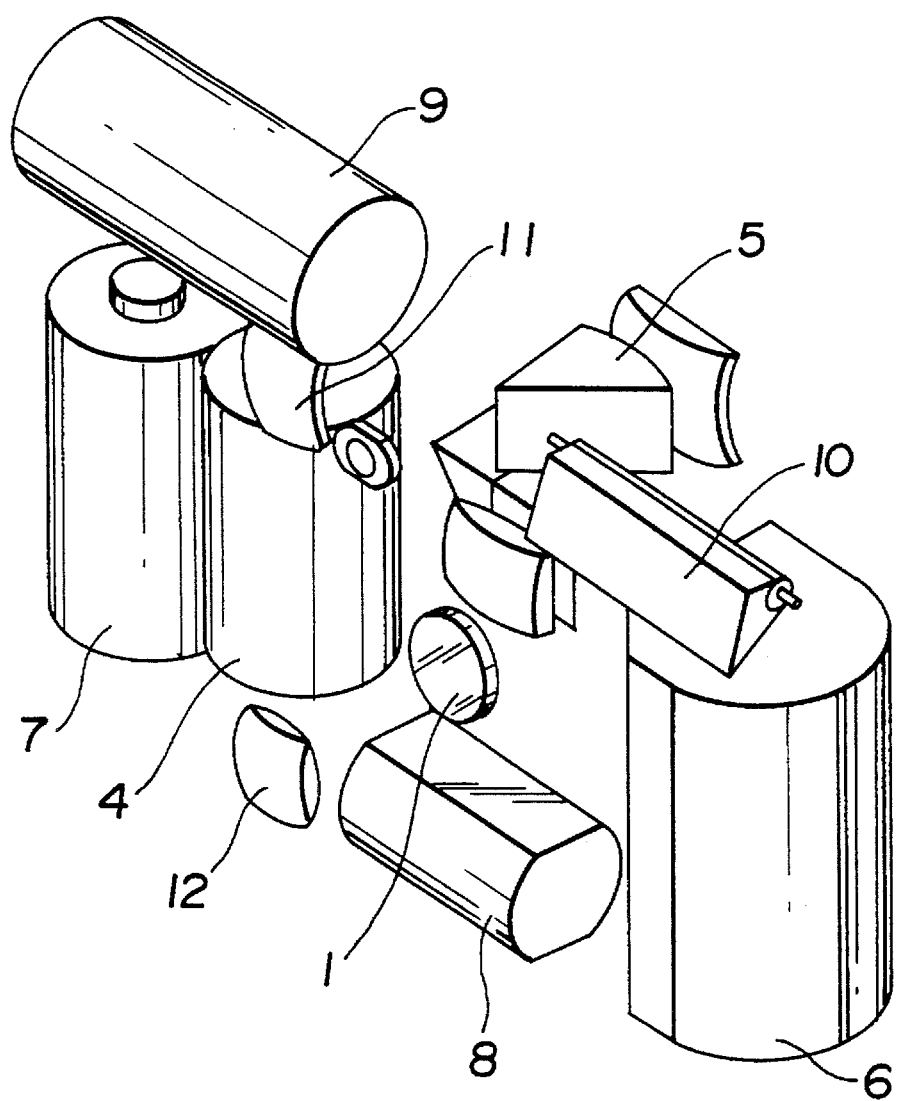
FIG. 3 is an oblique view showing the layout of major components of the camera of the embodiment.

FIGS. 1 to 3 show the layout of major components of a camera in accordance with an embodiment of the present invention. FIG. 1 is a front view. FIG. 2 is a top view. FIG. 3 is an oblique view.

The camera illustrated is a camera dedicated to a small-sized Patrone containing film that has a smaller width than rolled film (i.e. 35 mm wide) conformable to Japanese Industrial Standard JIS-135 and adaptable for many types of existing cameras. The camera is characterized by the arrangement that a light projecting lens belonging to a photometric optical system for automatic focusing lies above a film take-up chamber (spool chamber) and a light receiving lens belonging to the photometric optical system lies below the film take-up chamber.

By employing a small-sized Patrone, spaces are created above and below the film take-up chamber. The present applicant has put emphasis on this fact and proposed the present invention for utilizing these spaces. Referring to the drawings, the present invention will be described in detail.

The camera has a photographing lens 1 located along the front surface of a camera body and substantially in the center thereof. An aperture 3 is formed behind the photographing lens 1. The photographing lens 1 and aperture 3 are coupled with each other by means of an interceptive cylinder 2 that intercepts incident external light. A film take-up chamber (spool chamber) 4 is formed in one lateral part of the camera body. A Patrone chamber 6 in which a small-sized Patrone such as the one described above is loaded is formed in the other lateral part of the camera body.

A viewfinder 5 lies above the photographing lens 1. A drive motor 8 for use in winding or rewinding film and driving lenses lies below the photographing lens 1. A built-in battery 7 for a camera is stowed beyond the film take-up chamber 4 in one lateral part of the camera body. A main capacitor 9 for strobe flashing is located above the built-in battery 7. A strobe unit 10 lies above and in front of the Patrone chamber 6.

A photometric light projecting unit belonging to a photometric optical system for automatic focusing is located above the film take-up chamber 4. A photometric light receiving unit belonging to the photometric optical system is located below the film take-up chamber 4. A light projecting lens 11 and a light receiving lens 12, which are capable of projecting and receiving light respectively, are mounted on the front surfaces of the photometric light projecting and light receiving units. A light receptor 13 designed for exposure control for a shutter is placed by the side of the light projecting lens 11 near the center of the camera body. A release button 14 is mounted on the top of the camera body.

According to this embodiment, as long as an automatic focusing camera dedicated to the aforesaid kind of small-sized Patrone is concerned, the whole of the camera can be designed more compactly and a base length large enough for a photometric optical system for automatic focusing can be ensured.

As mentioned above, according to the present invention, there is provided a camera in which a base length required for automatic focusing is ensured despite the employment of a small-sized Patrone.

In the present invention, it is apparent that a wide range of different working modes can be formed on the basis of the invention without departing from the sprit and scope of the invention. This invention is not restricted to any specific embodiments except as may be limited by the appended claims.

What is claimed is:

1. A camera, comprising:
   a photographic optical system;
   an aperture formed behind said photographic optical system in order to limit a range of subject light irradiated toward a film surface;
   a cartridge chamber lying on one side of said aperture to accommodate a small-sized film cartridge containing film that is smaller than roller film of 35 mm width, said film cartridge being stowed in said cartridge chamber so that a built-in take-up axis of said film cartridge is oriented in parallel with a height of said camera;
   a take-up chamber lying on another side of said aperture to wind in a portion of film that has been fed from said film cartridge stowed in said cartridge chamber in a lateral direction of said camera and has passed behind said aperture;
   a light projecting optical system lying to one side of said take-up chamber to distribute light for range finding toward an object to be photographed; and
   a light receiving optical system lying to another side of said take-up chamber opposite said one side to receive light emanated from said light projecting optical system and reflected from said object to be photographed.

2. A camera according to claim 1 wherein said light receiving and light projecting optical systems are arranged so that a line extending between said light receiving and light projecting optical systems is substantially parallel to a take-up axis of said take-up chamber about which a film is wound.

3. A camera according to claim 2 wherein the line extending between said light receiving and light projecting optical systems passes through the take-up axis.

4. A camera according to claim 1 further comprising a portable battery arranged in said camera, said cartridge chamber being positioned between said battery and said photographic optical system; and
   said battery being positioned between said cartridge chamber and one side end of the camera.

5. A camera according to claim 4 further comprising an annular-shaped main capacitor positioned so that a central axis thereof is transverse to a take-up axis of said film spool, said main capacitor being positioned so that a portion thereof lies between an end of said battery and an upper end of said camera and another portion thereof lies between an end of said take-up chamber and an upper end of said camera.

6. A camera according to claim 5 further comprising a narrow elongated strobe unit having a longitudinal axis aligned transverse to a central axis of said film cartridge chamber, a portion of said strobe unit lying between a portion of an upper end of said camera and one end of said film cartridge chamber.

7. A camera, comprising:
   a photographic optical system;
   an aperture formed behind said photographic optical system to limit a range of subject light irradiated to a film surface;
   a cartridge chamber lying on one side of said aperture to accommodate a small-sized film cartridge containing film that is smaller than rolled film of 35 mm width;
   a take-up chamber lying on another side of said aperture opposite said one side to wind in a portion of film that has been fed from said film cartridge stowed in said cartridge chamber and that has passed behind said aperture;
   a light projecting optical system lying to one side of said take-up chamber to distribute light for range finding toward an object to be photographed; and
   a light receiving optical system lying another side of said take-up chamber opposite said one side of said take-up chamber to receive light emanated from said light projecting optical system and reflected from said object to be photographed.

8. A camera, comprising:
   a cartridge chamber in which a film cartridge is stowed;
   a take-up chamber for winding in a portion of film fed from said film cartridge stowed in said cartridge chamber in a lateral direction of said camera and that has passed behind a photographic optical system;
   a light projecting optical system lying to one side of said take-up chamber to distribute light for range finding toward an object to be photographed; and
   a light receiving optical system lying to another side of said take-up chamber opposite said one side to receive light emanated from said light projecting optical system and reflected from said object to be photographed.

9. A camera, comprising:
   an adjustable photographic optical system;
   a cartridge chamber lying in a lateral part of a camera body to accommodate a film cartridge;
   a take-up chamber and said cartridge chamber being symmetrically arranged with respect to said photographic optical system, said take-up chamber being provided to wind in and preserve film pulled out of said film cartridge; and
   a drive mechanism lying to one side of said photographic optical system to selectively drive said adjustable photographic optical system or transport said film, spaces being created on opposite sides of said take-up chamber;

a light projecting optical system designed for automatic focusing being placed in one of said spaces, and a light receiving optical system being placed in the other one of said spaces, and a viewfinder optical system and said drive mechanism being arranged on opposite sides of said photographic optical system.

10. A camera, comprising:

an adjustable photographic optical system;

a cartridge chamber lying in one lateral part of a camera body to accommodate a film cartridge;

a film take-up chamber and said cartridge chamber being symmetrical with respect to said photographic optical system, said take-up chamber being provided to wind in and preserve film pulled out of said film cartridge;

a drive mechanism lying to one side of said photographic optical system to selectively drive said adjustable photographic optical system or transport said film;

spaces being provided on opposite sides of said take-up chamber;

a range finding means designed for automatic focusing and composed of a light projecting optical system, which lies in one of said spaces and a light receiving optical system lying in another one of said spaces, and a viewfinder optical system and said drive mechanism being on opposite sides of said photographic optical system.

11. A camera, comprising:

a film cartridge chamber and film take-up chamber lying in a lateral direction of said camera with a photographic optical system arranged between them;

a viewfinder optical system and a film feed mechanism lying in a direction of said camera perpendicular to said lateral direction, said photographic optical system being arranged between them;

a battery chamber lying to one side of said film take-up chamber;

at least part of a strobe circuit lying in a part of said camera above said battery chamber;

a photometric light projecting optical system lying in one of a pair of spaces created on opposite sides of said film take-up chamber; and a photometric light receiving optical system lying in another one of said pair of spaces.

12. A camera, wherein:

a film cartridge chamber and a film take-up chamber are aligned in a lateral direction of said camera with a photographic optical system arranged between them;

a viewfinder optical system and a film feed mechanism are aligned in a direction of said camera perpendicular to said lateral direction with said photographic optical system arranged between them;

a battery chamber located to one side of said film take-up chamber;

at least part of a strobe circuit being located above said battery chamber; and a photometric light projecting optical system being placed in one of a pair of spaces created on opposite sides of said film take-up chamber and a photometric light receiving optical system being placed in another one of said pair of spaces.

13. A camera, comprising:

a photographic optical system;

an aperture formed behind said photographic optical system to limit a range of subject light irradiated to a film surface;

an interceptive cylinder for joining said photographic optical system with said aperture and preventing external light from entering the region between said optical system and said aperture;

a cartridge chamber lying on one side of said aperture to accommodate a small-size film cartridge containing film that is smaller than rolled film of 35 mm width, said film cartridge being stowed in said cartridge chamber so that a built-in take-up axis of said film cartridge is oriented substantially parallel to a height of said camera;

a take-up chamber lying on another side of said aperture opposite said one side to wind in a portion of film that has been fed from said film cartridge stowed in said cartridge chamber in a lateral direction of said camera and that has passed behind said aperture;

a light projecting optical system lying to one side of said take-up chamber to distribute light to be used for range finding toward an object to be photographed;

a light receiving optical system lying to another side of said take-up chamber opposite the one side of said take-up chamber to receive light emanated from said light projecting optical system and reflected from said object to be photographed;

a luminance measuring optical system lying to one side of said light projecting optical system and to one side of said photographic optical system so that luminance of said object to be photographed can be measured;

a viewfinder optical system lying to one side of said luminance measuring optical system and to one side of said photographic optical system so that said object to be photographed can be viewed;

a flashing means lying to one side of said cartridge chamber and to one side of said viewfinder optical system to irradiate flashlight toward said object to be photographed, said flashing means being arranged so that a longitudinal direction thereof is substantially parallel with the lateral direction of said camera;

a battery chamber lying to one side of said take-up chamber away from said photographic optical system to supply power to said camera, said battery chamber accommodating a supply battery and aligned so that a longitudinal direction of said supply battery is substantially in parallel with a height of said camera;

a capacitor lying in a portion of the camera by a side of said light projecting optical system above said take-up chamber and battery chamber to store light emission energy for said flashing means, said capacitor being arranged so that a longitudinal direction thereof is substantially in parallel with the lateral direction of said camera; and a motor lying between said light receiving optical system and a bottom of said cartridge chamber below said photographic optical system to supply mechanical driving force to the camera, said motor having an output axis thereof oriented substantially in parallel with the lateral direction of said camera.

* * * * *